US012091525B2

(12) United States Patent
Zia et al.

(10) Patent No.: US 12,091,525 B2
(45) Date of Patent: Sep. 17, 2024

(54) POLYOXYMETHYLENE COMPOSITION IN FOOD HANDLING APPLICATIONS

(71) Applicant: Celanese International Corporation, Irving, TX (US)

(72) Inventors: Qamer Zia, Raunheim (DE); Kai-Uwe Toennes, Frankfurt (DE); Kirsten Markgraf, Weinheim (DE)

(73) Assignee: CELANESE INTERNATIONAL CORPORATION, Irving, TX (US)

( * ) Notice: Subject to any disclaimer, the term of this patent is extended or adjusted under 35 U.S.C. 154(b) by 92 days.

(21) Appl. No.: 16/426,625

(22) Filed: May 30, 2019

(65) Prior Publication Data
US 2019/0367703 A1 Dec. 5, 2019

Related U.S. Application Data

(60) Provisional application No. 62/719,883, filed on Aug. 20, 2018, provisional application No. 62/680,171, filed on Jun. 4, 2018.

(51) Int. Cl.
C08K 13/02 (2006.01)
C08G 2/08 (2006.01)
(Continued)

(52) U.S. Cl.
CPC ............. *C08K 13/02* (2013.01); *C08G 2/08* (2013.01); *C08K 3/34* (2013.01); *C08K 3/40* (2013.01);
(Continued)

(58) Field of Classification Search
CPC . C08K 13/02; C08K 3/34; C08K 3/40; C08K 5/098; C08K 5/103; C08K 5/20; C08K 7/14; C08G 2/08; C08L 59/02
See application file for complete search history.

(56) References Cited

U.S. PATENT DOCUMENTS 8,816,015 B2 8/2014 Luo et al.
2003/0022978 A1* 1/2003 Hohner .................... C08K 5/00
524/487
(Continued)

FOREIGN PATENT DOCUMENTS

EP 0289142 A2 * 11/1988 ............. C08L 59/00
EP 1595918 A1 11/2005
(Continued)

OTHER PUBLICATIONS

English machine translation of JP 2015-209499 (Year: 2015).*
(Continued)

*Primary Examiner* — John E Uselding
(74) *Attorney, Agent, or Firm* — DORITY & MANNING, P.A.

(57) ABSTRACT

The present disclosure is directed to a polyacetal, or polyoxymethylene (POM), base composition which contains an additive package containing additives suitable for food processing applications. Polyacetal or polyoxymethylene polymers are of the class of polymers containing —CH$_2$O— repeat units, useful for molding all different types of products and articles. Of particular advantage, POM produced according to the present disclosure may demonstrate low formaldehyde emissions, extractables, or both, when measured by standard methods without containing any formaldehyde scavenger packages.

24 Claims, 3 Drawing Sheets

(51) Int. Cl.
 C08K 3/34 (2006.01)
 C08K 3/40 (2006.01)
 C08K 5/098 (2006.01)
 C08K 5/103 (2006.01)
 C08K 5/20 (2006.01)
 C08K 7/14 (2006.01)
 C08L 59/02 (2006.01)

(52) U.S. Cl.
 CPC .............. *C08K 5/098* (2013.01); *C08K 5/103* (2013.01); *C08K 5/20* (2013.01); *C08K 7/14* (2013.01); *C08L 59/02* (2013.01); *C08K 2003/343* (2013.01); *C08K 2201/014* (2013.01); *C08L 2201/08* (2013.01); *C08L 2205/06* (2013.01); *C08L 2205/24* (2013.01)

(56) References Cited

U.S. PATENT DOCUMENTS

| 2003/0162912 | A1* | 8/2003 | Disch | C08K 5/10 |
| | | | | 524/394 |
| 2004/0030094 | A1 | 2/2004 | Zierer et al. | |
| 2007/0066746 | A1* | 3/2007 | Gunnewig | C08L 2666/14 |
| | | | | 524/500 |
| 2007/0073007 | A1 | 3/2007 | Harashina | |
| 2008/0242800 | A1 | 2/2008 | Disch et al. | |
| 2013/0324675 | A1 | 12/2013 | Ticona | |
| 2016/0222202 | A1* | 8/2016 | Kato | C08K 5/3445 |

FOREIGN PATENT DOCUMENTS

| JP | 60-096622 | A | * | 5/1985 | ............... C08J 3/22 |
| JP | 2015003954 | A | | 1/2015 | |
| JP | 2015209499 | | * | 11/2015 | .............. C08L 59/04 |
| JP | 2017/197635 | A | | 11/2017 | |
| JP | 2017/197636 | A | | 11/2017 | |
| WO | WO2014084160 | A1 | | 6/2014 | |

OTHER PUBLICATIONS

English machine translation of JP 60-096622A (Year: 1985).*
English machine translation of JP 2015-003954A. (Year: 2015).*
PCT/US19/34583 International Search Report and Written Opinion dated Aug. 19, 2019.
Polyoxymethylene, Wikipedia, Mar. 28, 2018 (Mar. 28, 2018) [retrieved Jul. 17, 2019] (Jul. 17, 2019) via https://en.wikipedia.org/w/index.php?title=Polyoxymethylene &oldid=832798524].
Commission Regulation (EU) No. 10/2011', Official Journal of the European Union, Jan. 15, 2011, (Jan. 15, 2011) L12, p. 1-89, particularly p. 69-70 and 86, [retrieved Jul. 18, 2019 (Jul. 18, 2019) via ,http://eu-lex.europe.eu/eli/reg/2011/10/oj>].
European Search Report Corresponding to Application No. EP19815707 Dated Jan. 10, 2022.

* cited by examiner

POLYOXYMETHYLENE COMPOSITION IN FOOD HANDLING APPLICATIONS

RELATED APPLICATIONS

The present application is based upon and claims priority to U.S. Provisional Application Ser. No. 62/719,883, having a filing date of Aug. 20, 2018, and U.S. Provisional Application Ser. No. 62/680,171, having a filing date of Jun. 4, 2018, both incorporated herein by reference in their entirety.

BACKGROUND

Polyacetal polymers, which are commonly referred to as polyoxymethylenes, have become established as exceptionally useful engineering materials in a variety of applications. Polyoxymethylene polymers, for instance, are widely used in constructing molded parts, such as parts for use in the automotive industry and the electrical industry. Polyoxymethylene polymers, for instance, have excellent mechanical property, fatigue resistance, abrasion resistance, chemical resistance, and moldability.

Although polyacetal resins possess many useful properties, the polymers have a tendency to degrade when heated and are inherently unstable in an oxidative atmosphere or in an acidic or alkaline environment. In one aspect, polyacetal resins have a tendency to emit formaldehyde during processing and after the polymer has been molded into a part. Those skilled in the art have attempted to combine polyacetal polymers with various additive compounds in order to lower formaldehyde emissions. For instance, in the past, polyacetal polymers have been combined with melamines in order to achieve lower formaldehyde emission performance. Various other chemical compounds have been suggested for lowering formaldehyde emissions. Although various chemical compounds used in the past have successfully lowered formaldehyde emissions from products made from polyoxymethylene polymers, further improvements in formaldehyde emission and extractable content are needed.

Other additives are often employed in the production of polyacetal resins, such as processing aids and polymerization enhancing additives.

In general, it may be desirable to obtain polyacetal polymers with additives suitable for food handling applications that perform just as well or better than existing additive compounds, even existing additives suitable for food handling applications.

In view of the above, a need exists for an improved polyacetal base composition having an additive package suitable for food handling applications.

SUMMARY

In general, the present disclosure is directed to polyoxymethylene polymer compositions particularly well suited for food contact applications. The polymer composition of the present disclosure, for instance, is particularly formulated so as to have dramatically low formaldehyde extractable levels and formaldehyde emission levels without the use of many conventional additives. For instance, the polymer composition of the present disclosure can be formulated to be free of guanamine formaldehyde scavengers, urea formaldehyde scavengers, melamine formaldehyde scavengers, dicyandiamide formaldehyde scavengers and, in one embodiment, contains no formaldehyde scavengers. The polymer composition can also be formulated so as to be free of citric acid salts and/or polymeric nucleants. For example, in one embodiment, the polymer composition contains a mineral nucleant.

In one embodiment, the polymer composition contains a polyoxymethylene polymer. The polyoxymethylene polymer can be present in the polymer composition in an amount greater than about 50% by weight, such as in an amount greater than about 60% by weight, such as in an amount greater than about 70% by weight, such as in an amount greater than about 80% by weight, such as in an amount greater than about 90% by weight. The polyoxymethylene polymer can have a melt volume flow rate of from about 1 $cm^3$ per 10 min to about 80 $cm^3$ per 10 min when tested at 190° C. and at a load of 2.16 kg. In one embodiment, for instance, the melt volume flow rate can be from about 6 $cm^3$ per 10 min to about 28 $cm^3$ per 10 min. Alternatively, the polyoxymethylene polymer may have a melt flow rate of from about 30 $cm^3$ per 10 min to about 55 $cm^3$ per 10 min.

The polyoxymethylene polymer is combined with a mineral nucleant and optionally an antioxidant, an acid scavenger, and a lubricant. As described above, the polymer composition can be substantially free of formaldehyde scavengers and yet display a formaldehyde emission when tested according to VDA Test 275 of less than about 15 ppm, such as less than about 12 ppm, such as less than about 10 ppm, such as less than about 8 ppm, such as less than about 6 ppm, such as less than about 4 ppm. The polymer composition can also display a formaldehyde extractable level of less than about 15 ppm, such as less than about 12 ppm, such as less than about 10 ppm when tested in water at a temperature of 140° C. for 10 days. The polymer composition can also have the above formaldehyde extractable levels when tested in water at 100° C. for 30 minutes.

In one embodiment, the mineral nucleant comprises talc. Talc can be present in the polymer composition, for instance, in an amount from about 0.01% by weight to about 1% by weight. The polymer composition can also contain an acid scavenger comprising a carboxylic acid salt. For instance, the acid scavenger may comprise an alkaline earth metal salt of a carboxylic acid such as a calcium hydroxy stearate. In one embodiment, for example, the acid scavenger is calcium 12-hydroxystearate and is present in the polymer composition in an amount from about 0.01% by weight to about 1% by weight.

The polymer composition can optionally contain an antioxidant and/or a lubricant. The lubricant may comprise a naturally derived wax such as a plant derived wax. For instance, the lubricant may comprise ethylene bis(stearamide). The lubricant can be present in the polymer composition in an amount from about 0.01% by weight to about 1% by weight.

In one embodiment, the polymer composition can contain one or more coloring agents. In one embodiment, however, the polymer composition can be free of iron oxide pigments. In one embodiment, the coloring agents can be combined with a polymer that helps disperse the coloring agents in the polymer matrix. The polymer used to disperse the coloring agents can comprise a lubricant as described above. For instance, the polymer dispersant may comprise a polyolefin polymer, such as a polyethylene wax. The polyethylene wax may comprise a non-polar wax having a medium molecular weight. The molecular weight of the polyethylene wax, for instance, can be less than about 10,000 g/mol, such as less than about 8,000 g/mol, such as less than about 6,000 g/mol, such as less than about 4,000 g/mol and generally greater than about 100 g/mol, such as greater than about 500 g/mol, such as greater than about 1,000 g/mol. The polyethylene wax can have a density of from about 0.9 g/cm³ to about 0.95 g/cm³, such as from about 0.92 g/cm³ to about 0.94 g/cm³.

The polymer composition can also contain a thermoplastic elastomer such as a thermoplastic polyurethane elastomer.

Various different molded articles can be made in accordance with the present disclosure. As described above, the molded articles are particularly well suited for use in food contact applications. For instance, in one embodiment, the molded article may comprise a part of a consumer appliance, such as a coffeemaker part. The molded article may also comprise a conveyor part, such as a conveyor part that is incorporated into a conveyor in a food industrial application. The present disclosure is also well suited to producing medical products.

Other features and aspects of the present disclosure are discussed in greater detail below.

BRIEF. DESCRIPTION OF THE DRAWINGS

A full and enabling disclosure of the present disclosure is set forth more particularly in the remainder of the specification, including reference to the accompanying figures.

Figure 1:
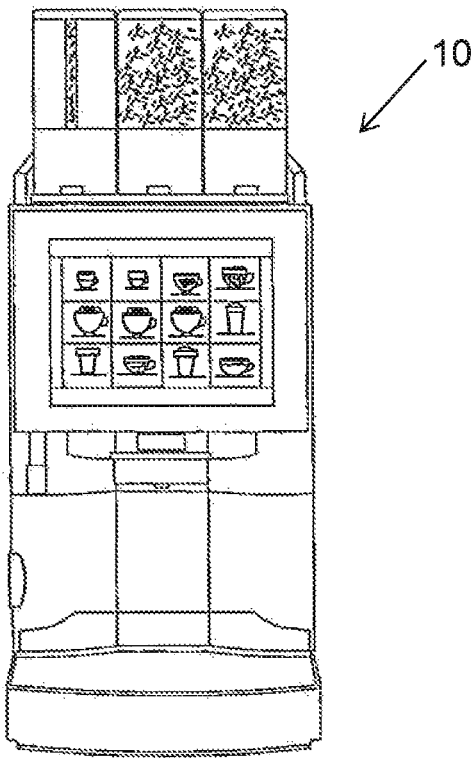
FIG. 1 illustrates one embodiment of a coffee maker apparatus comprising a composition prepared according to the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polyacetal, or polyoxymethylene (POM), base composition which contains an additive package containing additives suitable for food processing applications.

For instance, POM produced according to the present disclosure may, in some embodiments, advantageously exhibit good crystallization performance without synthetic or polymeric nucleating agents such as polyoxymethylene terpolymer nucleating agents. The POM may also be free of one or more of polyvinylidenefluoride nulceants, benzoic-acid derivative nucleants, phosphate salt nucleants, carboxylic acid salt nucleants, sorbital-based nucleants, and polyamide nucleants. Advantageously, the POM composition may contain mineral nucleants suitable for food processing applications, such as talc or clay (e.g., bentonite, calcined kaolin) compounds.

Of additional advantage, POM produced according to the present disclosure may demonstrate low formaldehyde emissions, extractables, or both, when measured by standard methods (e.g., VDA 275, GB4806.6-2016), without containing any formaldehyde scavenger packages. In some embodiments, the POM may be free of certain formaldehyde scavenging compositions, such as those which contain one or more of guanamine compounds (e.g., an aliphatic guanamine-based compound, an alicyclic guanamine-based compound, an aromatic guanamine-based compound, a hetero atom-containing guanamine-based compound, or the like), hydantoin compounds, copolyamide compounds, amino acid compounds (e.g., monoaminomonocarboxylic acid, a monoaminodicarboxylic acid, or arginine), melamine compounds, and urea compounds. For instance, the POM composition may be free of one or more of benzoguanamine, dicyandiamide, and allantoin. In some cases, however, formaldehyde scavengers may optionally be used, including dicyandiamide and copolyamides, such as a nylon terpolymer (e.g., nylon 66/610/6).

Of additional advantage, the POM compositions produced according to the present disclosure may demonstrate formaldehyde emission levels and formaldehyde extractable levels within ranges specified by various food contact regulations, such as FDA food contact standards such as Title 21 Code of Federal Regulations (CFR)); EU food contact standards such as Regulation (EC) No. 1935/2004, 2023/2006, 10/2011, Resolution AP (89) 1, Germany BfR IX, Spain Real Decreto 847/2011, and Italy Decreto 21/3/73; and Chinese food contact standards such as GB 9685-2016.

The preparation of the polyoxymethylene polymer can be carried out by polymerization of polyoxymethylene-forming monomers, such as trioxane or a mixture of trioxane and a cyclic acetal such as dioxolane in the presence of a molecular weight regulator, such as a glycol. The polyoxymethylene polymer used in the polymer composition may comprise a homopolymer or a copolymer. According to one embodiment, the polyoxymethylene is a homo- or copolymer which comprises at least 50 mol. %, such as at least 75 mol. %, such as at least 90 mol. % and such as even at least 97 mol. % of —CH₂O-repeat units.

In one embodiment, a polyoxymethylene copolymer is used. The copolymer can contain from about 0.01 mol. % to about 20 mol. % and in particular from about 0.5 mol. % to about 10 mol. % of repeat units that comprise a saturated or ethylenically unsaturated alkylene group having at least 2 carbon atoms, or a cycloalkylene group, which has sulfur atoms or oxygen atoms in the chain and may include one or more substituents selected from the group consisting of alkyl cycloalkyl, aryl, aralkyl, heteroaryl, halogen or alkoxy. In one embodiment, a cyclic ether or acetal is used that can be introduced into the copolymer via a ring-opening reaction.

Preferred cyclic ethers or acetals are those of the formula:

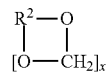

in which x is 0 or 1 and R² is a C₂-C₄-alkylene group which, if appropriate, has one or more substituents which are C₁-C₄-alkyl groups, or are C₁-C₄-alkoxy groups, and/or are halogen atoms, preferably chlorine atoms. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers. It is particularly advantageous to use copolymers composed of from 99.5 to 95 mol. % of trioxane and of from 0.01 to 5 mol. %, such as from 0.5 to 4 mol. %, of one of the above-mentioned comonomers. In one embodiment, the polyoxymethylene polymer contains relatively low amounts of comonomer. For instance, the comonomer can be present in an amount less than about 2 mol. %, such as less than about 1.5 mol. %, such as less than about 1 mol. %, such as less than about 0.8 mol. %, such as less than about 0.6 mol. %.

The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted.

In one embodiment, the polyoxymethylene polymer used in the polymer composition may contain a relatively high amount of reactive groups or functional groups in the terminal positions. The reactive groups, for instance, may comprise —OH or —NH$_2$ groups.

In one embodiment, the polyoxymethylene polymer can have terminal hydroxyl groups, for example hydroxyethylene groups and/or hydroxyl side groups, in at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. It should be understood that the total number of terminal groups present includes all side terminal groups.

In one embodiment, the polyoxymethylene polymer has a content of terminal hydroxyl groups of at least 15 mmol/kg, such as at least 18 mmol/kg, such as at least 20 mmol/kg. In one embodiment, the terminal hydroxyl group content ranges from 18 to 50 mmol/kg. In an alternative embodiment, the polyoxymethylene polymer may contain terminal hydroxyl groups in an amount less than 20 mmol/kg, such as less than 18 mmol/kg, such as less than 15 mmol/kg. For instance, the polyoxymethylene polymer may contain terminal hydroxyl groups in an amount from about 5 mmol/kg to about 20 mmol/kg, such as from about 5 mmol/kg to about 15 mmol/kg. For example, a polyoxymethylene polymer may be used that has a lower terminal hydroxyl group content but has a higher melt volume flow rate.

In addition to or instead of the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of —CH$_2$O-repeat units.

In one embodiment, a polyoxymethylene polymer can be produced using a cationic polymerization process followed by solution hydrolysis to remove any unstable end groups. During cationic polymerization, a glycol, such as ethylene glycol or methylal can be used as a chain terminating agent. A heteropoly acid, triflic acid or a boron compound may be used as the catalyst.

The polyoxymethylene polymer can have any suitable molecular weight. The molecular weight of the polymer, for instance, can be from about 4,000 grams per mole to about 20,000 g/mol. In other embodiments, however, the molecular weight can be well above 20,000 g/mol, such as from about 20,000 g/mol to about 100,000 g/mol.

The polyoxymethylene polymer present in the composition can generally have a melt flow index (MFI) ranging from about 0.1 to about 80 cm$^3$/10 min, as determined according to ISO 1133 at 190° C. and 2.16 kg. In one embodiment, the polyoxymethylene polymer may have a melt flow index of greater than about 1 cm$^3$/10 min, such as greater than about 2 cm$^3$/10 min, such as greater than about 5 cm$^3$/10 min, such as greater than about 10 cm$^3$/10 min, such as greater than about 20 cm$^3$/10 min, such as greater than about 30 cm$^3$/10 min. The polymer may, in some cases, have a melt flow index of less than about 55 cm$^3$/10 min, such as less than about 45 cm$^3$/10 min, such as less than about 35 cm$^3$/10 min, such as less than about 25 cm$^3$/10 min, such as less than about 15 cm$^3$/10 min, such as less than about 10 cm$^3$/10 min, such as less than about 5 cm$^3$/10 min.

The polyoxymethylene polymer may be present in the polyoxymethylene polymer composition in an amount of at least 50 wt. %, such as at least 60 wt. %, such as at least 70 wt. %, such as at least 80 wt. %, such as at least 85 wt. %, such as at least 90 wt. %, such as at least 93 wt. %. In general, the polyoxymethylene polymer is present in an amount of less than about 100 wt. %, such as less than about 99 wt. %, such as less than about 97 wt. %, wherein the weight is based on the total weight of the polyoxymethylene polymer composition.

The polymer composition of the present disclosure can contain various additives and ingredients. For instance, in one embodiment, the polymer composition may contain an acid scavenger. The acid scavenger can comprise a carboxylic acid salt.

For instance, the carboxylic acid salt may comprise a salt of a fatty acid, such as a metal salt of a fatty acid. For example, the carboxylic acid salt may comprise an alkaline earth metal salt of a fatty acid. The cation of the salt, for instance, may comprise calcium, barium, lithium, sodium, magnesium, zinc, or the like.

The fatty acid can contain a carbon chain of generally from about 3 carbon atoms to about 20 carbon atoms. The fatty acid may comprise a dicarboxylic acid or a tricarboxylic acid.

In one embodiment, the metal salt of the fatty acid may comprise one or more of a metal salt of citric acid, propionic acid, stearic acid, butanoic acid, hexanoic acid, decanoic acid, lauric acid, myristic acid, palmitic acid, and the like. In one particular embodiment, the metal salt of the fatty acid may comprise lithium 12-hydroxystearate, calcium 12-hydroxystearate, calcium stearate, and mixtures thereof. In some cases, citric acid and salts thereof (e.g., tricalcium citrate) may be included in the POM composition, although the composition may also be free of said salts of citric acid.

One or more carboxylic acid salts are generally present in the polymer composition in an amount greater than about 0.001% by weight, such as in an amount greater than about 0.01% by weight, such as in an amount greater than about 0.05% by weight, such as in an amount greater than about 0.1% by weight, such as in an amount greater than about 0.2% by weight, such as in an amount greater than about 0.3% by weight, such as in an amount greater than about 0.4% by weight, such as in an amount greater than about 0.5% by weight. One or more carboxylic acid salts are generally present in the polymer composition in an amount less than about 5% by weight, such as in an amount less than about 3% by weight, such as in an amount less than about 2% by weight, such as in an amount less than about 1.5% by weight, such as in an amount less than about 1% by weight.

The polymer composition of the present disclosure may also contain other known additives such as, for example, antioxidants, UV stabilizers or heat stabilizers, impact modifiers and/or reinforcing fibers. In addition, the compositions can contain processing auxiliaries, for example adhesion promoters, lubricants, nucleants, demolding agents, fillers, or antistatic agents and additives which impart a desired property to the compositions and articles or parts produced therefrom.

In one embodiment, a nucleant may be present. The nucleant may increase crystallinity and may comprise a mineral compound such as talc or clay. For instance, the nucleant may be composed of a mineral compound such as a talc or a clay, including kaolin and bentonite. The nucleant may be present in the composition in an amount of at least about 0.01 wt. %, such as at least about 0.05 wt. %, such as at least about 0.1 wt. % and less than about 2 wt. %, such as less than about 1.5 wt. %, such as less than about 1 wt. %, wherein the weight is based on the total weight of the respective polymer composition.

In one embodiment, an antioxidant, such as a sterically hindered phenol, may be present. Examples which are available commercially are pentaerythrityl tetrakis[3-(3,5-di-tert-butyl-4-hydroxyphenyl)propionate] (antioxidant 1010) and triethylene glycol bis[3-(3-tert-butyl-4-hydroxy-5-methylphenyl)propionate] (antioxidant 245). The antioxidant may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, an ultraviolet light stabilizer may be present. The ultraviolet light stabilizer may comprise a benzophenone, a benzotriazole, or a benzoate. The UV light absorber, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition. In some examples, the UV light absorber does not comprise a butanodioic acid or polymer thereof, although other examples may contain, for instance, an oligomeric hindered amine light stabilizer (HALS) such as a butanedioic acid dimethylester polymer with 4-hydroxy-2,2,6,6-tetramethyl-1-piperidine ethanol.

In one embodiment, light stabilizers, such as sterically hindered amines, may be present in addition to the ultraviolet light stabilizer. Hindered amine light stabilizers that may be used include oligomeric hindered amine compounds that are N-methylated. For instance, hindered amine light stabilizer may comprise a high molecular weight hindered amine stabilizer. Other embodiments of light stabilizers include 2,2,6,6-tetramethyl-4-piperidyl compounds, e.g., bis(2,2,6,6-tetramethyl-4-piperidyl) sebacate or the polymer of dimethyl succinate and 1-(2-hydroxyethyl)-4-hydroxy-2,2,6,6-tetramethyl-4-piperidine. In one embodiment, the light stabilizer may comprise 2-(2H-benzzotriazol-2-yl) 4,6-bis(1-ethyl-1-phenyl-ethyl)phenol. The light stabilizers, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, lubricants may be present. Lubricants may be added to the composition for various reasons. For instance, lubricants can facilitate the molding process and/or facilitate removing the composition from a mold. Lubricants can also affect the viscosity of the composition when in a molten state. In addition, lubricants can be present in order to assist in dispersing various components for producing a homogeneous composition. For instance, lubricants can act as dispersing agents in dispersing pigments and other coloring agents.

The lubricant may comprise a polymer wax composition. In some examples, one or more of a polyethylene (e.g., a polyethylene glycol), a wax (e.g., a paraffin, a polar polyethylene wax, or a Montan wax), a fatty acid (e.g., a stearic acid), an oleic acid (e.g., a tall oil), a siloxane (e.g., a polydimethylsiloxane), and a metal soap may be present in the composition. The polyethylene glycol, for instance, may have a molecular weight of from about 1000 to about 5000, such as from about 3000 to about 4000. In one embodiment, for instance, a PEG-35 or a PEG-70 may be present. In another embodiment, a fatty acid amide such as ethylene bis(stearamide) may be present. In other embodiments, the POM composition may be free from particular stearates such as magnesium stearate (although magnesium stearate may be present in some embodiments). In another example, a polyethylene wax for use in the composition (polar or non-polar) may contain or be composed of a high density, high molecular weight, oxidized polyethylene homopolymer. In some examples, the POM composition may be free from non-polar polyethylene waxes. Although some embodiments may contain solid lubricants such as hexagonal boron nitride, other embodiments may be free from said solid lubricants. Although some embodiments may contain a pentaerythritol ester (e.g., with stearic acid), other embodiments may be free from said pentaerythritol esters.

Other lubricating additives may be supplied in the form of a masterbatch. In one example, a siloxane polymer (e.g., ultra high molecular weight (UHMW) siloxane) dispersed in a polyoxymethylene may be incorporated as a lubricant. Other embodiments may be free from said UHMW siloxanes.

Lubricants may generally be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, the polymer composition and articles made from the composition may have a natural color. Alternatively, a coloring agent may be present. As described above, one or more coloring agents can be combined with a lubricant for dispersing the coloring agents throughout the composition. Coloring agents that may be used include any desired inorganic pigments, such as titanium dioxide, ultramarine blue, cobalt blue, and other organic pigments and dyes, such as phthalocyanines, anthraquinnones, and the like. In some examples, the POM composition may comprise one or more of a fluorescent brightener 184, a pigment orange 68, a pigment red 247, a pigment green 7, a pigment blue 15, a quinacridone red, a pigment violet 23, a pigment brown 24, and a pigment red 122. Other coloring agents include carbon black or various other polymer-soluble dyes. In one embodiment, a combination of coloring agents may be included in the polymer composition.

In some cases, the POM composition may be completely free from various pigments, such as iron oxide and iron hydroxide pigments (e.g., Bayferrox 110M, 120M, 3910, Colortherm Red 130M/160M/180M; e.g., those having particle sizes between 0.1 μm and 1 μm in increments of 0.1 μm therebetween), pigment red 101, pigment red 254, pigment yellow 180, chinophthalone pigments, nitrogenic pigments (e.g., Ni/Sb/Ti Oxide pigments), and sulfuric pigments (e.g., sodium alumina sulphosilicate). Of course, said pigments which may optionally be excluded may also be included in certain embodiments.

Heliogen Blue K 7090 is representative of a pigment blue 15 or unchlorinated copper phthalocyanine (beta form with approx. 11 wt. % copper). Unavoidable impurities are suppressed to less than 20 ppm antimony, less than 20 ppm arsenic, less than 20 ppm lead, less than 30 ppm cadmium, less than 50 ppm chromium, less than 20 ppm selenium, less than 20 ppm mercury, and less than 20 ppm zinc. Any primary aromatic amines are also suppressed to less than 100 ppm.

Sicotan Yellow K 2112 is representative of a rutile pigment based on chromium III oxide, antimony pentoxide, and titanium dioxide. Any acid-soluble antimony is present in an amount less than about 20 ppm. Additionally, unavoidable impurities are suppressed to 30 ppm arsenic, 50 ppm lead, less than 10 ppm cadmium, less than 10 ppm cobalt, less than 10 ppm copper, less than 50 ppm nickel, less than 1 ppm selenium, less than 1 ppm mercury, and less than 100 ppm zinc. Another example is Titanorange 6994.

Printex FP is representative of a carbon black or pigment black 7.

Kronos 2220 and 2233 are representative of rutile pigments produced by a chloride process, representative of R2 compounds corresponding to DIN EN ISO 591 part 1, containing, respectively, a minimum 95.5, 92.5, and 96 wt. % $TiO_2$ and are stabilized, respectively, with compounds containing aluminum, aluminum with silicon, and aluminum with silicon. The scattering power of a plastisol formulation containing the same may be, respectively, approximately 99 and 104. Various grades of titanium dioxide may be employed depending on the target design needs. For example, Kronos 2233 is a titanium dioxide which resists degradation of the carrier polymer and maintains tinting effects even at high processing temperatures.

PV Fast Green GNX is representative of a pigment green 7 (copper phthalocyanine).

PV Fast Red E5B is representative of a pigment violent 19 or a quinacridone red.

Heliogen Green K 8730 is representative of pigment green 7 or a chlorinated copper phthalocyanine (with approx. 5.6 wt. % copper). Unavoidable impurities are suppressed to less than 20 ppm antimony, less than 20 ppm arsenic, less than 20 ppm lead, less than 30 ppm cadmium, less than 50 ppm chromium, less than 20 ppm selenium, less than 20 ppm mercury, and less than 20 ppm zinc. Any primary aromatic amines are also suppressed to less than 100 ppm.

The coloring agent may be present in the composition in an amount of at least about 0.01 wt. %, such as at least about 0.05 wt. %, such as at least about 0.1 wt. %, such as at least about 0.5 wt. %, such as at least about 0.8 wt. %, such as at least about 1 wt. % and less than 5 wt. %, such as less than about 2.5 wt. %, such as less than about 1 wt. %, wherein the weight is based on the total weight of the respective polymer composition.

In one embodiment, one or more coloring agents can be added to the composition in conjunction with a lubricant that serves as a dispersing agent. In one embodiment, the lubricant may comprise a polyolefin, such as a polyethylene wax. In one particular embodiment, the dispersing agent comprises a polyethylene wax having a medium molecular weight. The molecular weight of the polyethylene, for instance, can generally be less than about 10,000 g/mol, such as less than about 8,000 g/mol, such as less than about 6,000 g/mol, such as less than about 4,000 g/mol and generally greater than about 500 g/mol, such as greater than about 1,000 g/mol. The polyethylene wax can have a density of from about 0.9 $g/cm^3$ to about 0.95 $g/cm^3$, such as from about 0.92 $g/cm^3$ to about 0.94 $g/cm^3$. Density can be measured according to ISO Test 1183.

The polyethylene dispersing agent can be precompounded with one or more coloring agents. Alternatively, the dispersing agent can be added with the coloring agent to the polymer composition. In one embodiment, the polyethylene wax can have a fine grain structure and can have a particle size of generally less than about 2,000 microns and generally greater than about 500 microns. When present, the dispersing agent (or lubricant) can be included in the polymer composition in an amount generally greater than about 0.0001% by weight, such as greater than about 0.001% by weight and generally less than about 2% by weight, such as less than about 1% by weight. The dispersing agent can be present in conjunction with one or more coloring agents at a weight ratio of from about 50:1 to about 1:10, such as from about 10:1 to about 1:5, such as from about 5:1 to about 1:1.

Fillers that may be included in the composition include glass beads, wollastonite, loam, molybdenum disulfide or graphite, and/or inorganic or organic fibers.

Reinforcing fillers which may be used in the composition include mineral fibers, such as glass fibers. These fibers may be in modified or unmodified form, e.g. provided with a sizing, or chemically treated, in order to improve adhesion to the polymer. Glass fibers are particularly preferred. In some cases, zinc oxides, such as active zinc oxides, may be used as fillers in the composition, but in other cases, the composition may be free of zinc oxides.

Glass fibers are provided with a sizing to protect the glass fiber, to smooth the fiber but also to improve the adhesion between the fiber and the matrix material. A sizing usually comprises silanes, film forming agents, lubricants, wetting agents, adhesive agents optionally antistatic agents and plasticizers, emulsifiers and optionally further additives.

The composition may optionally contain particular antistatic agents, including ethoxylated amines and polyoxyethylene alkylamine fatty acid esters, although the composition may also be free of said agents.

Specific examples of silanes are aminosilanes, e.g. 3-trimethoxysilylpropylamine, N-(2-aminoethyl)-3-aminopropyltrimethoxy-silane, N-(3-trimethoxysilanylpropyl)ethane-1,2-diamine, 3-(2-aminoethyl-amino)propyltrimethoxysilane, N-[3-(trimethoxysilyl)propyl]-1,2-ethane-diamine.

Film forming agents are, for example, polyvinylacetates, polyesters and polyurethanes.

The reinforcing fibers may be compounded into the polyoxymethylene matrix, for example in an extruder or kneader. However, the reinforcing fibers may also advantageously take the form of continuous-filament fibers sheathed or impregnated with the polyoxymethylene molding composition in a process suitable for this purpose, and then processed or wound up in the form of a continuous strand, or cut to a desired pellet length so that the fiber lengths and pellet lengths are identical. An example of a process particularly suitable for this purpose is the pultrusion process.

The reinforcing fibers can be present in the molding composition in an amount ranging from 5 to 45 wt.-%, such as from 10 to 40 wt.-%, wherein the weight is based on the total weight of the composition.

The polymer composition may comprise a triboadditive, such as, in one example, polytetrafluoroethylene (PTFE). However, in some examples, the composition may be free from PTFE.

The polymer composition may further comprise an impact modifier such as a thermoplastic elastomer. Thermoplastic elastomers are materials with both thermoplastic and elastomeric properties. Thermoplastic elastomers include styrenic block copolymers, polyolefin blends referred to as thermoplastic olefin elastomers, elastomeric alloys, thermoplastic polyurethanes, thermoplastic copolyesters, and thermoplastic polyamides.

Thermoplastic elastomers well suited for use in the present disclosure are polyester elastomers (TPE-E), thermoplastic polyamide elastomers (TPE-A) and in particular thermoplastic polyurethane elastomers (TPE-U).

In one particular embodiment, a thermoplastic polyurethane elastomer is used. The thermoplastic polyurethane elastomer, for instance, may have a soft segment of a long-chain diol and a hard segment derived from a diisocyanate and a chain extender. In one embodiment, the polyurethane elastomer is a polyester type prepared by reacting a long-chain dial with a diisocyanate to produce a polyurethane prepolymer having isocyanate end groups, followed by chain extension of the prepolymer with a diol chain extender. Representative long-chain dials are polyester dials such as poly(butylene adipate)diol, poly(ethylene adipate)diol and poly(ε-caprolactone)diol; and polyether dials such as poly(tetramethylene ether)glycol, poly(propylene oxide)glycol, poly(ethylene oxide)glycol, polycarbonate diol and/or a polyester polycarbonate dial. Suitable diisocyanates include 4,4'-methylenebis(phenyl isocyanate), 2,4-toluene diisocyanate, 1,6-hexamethylene diisocyanate and 4,4'-methylenebis-(cycloxylisocyanate). Suitable chain extenders are $C_2$-$C_6$ aliphatic dials such as ethylene glycol, 1,4-butanediol, 1,6-hexanediol and neopentyl glycol. One example of a thermoplastic polyurethane is characterized as essentially poly(adipic acid-co-butylene glycol-co-diphenylmethane diisocyanate).

The amount of thermoplastic elastomer contained in the polymer composition can vary depending upon various factors. For instance, the thermoplastic elastomer can be present in an amount ranging from about 0.5% by weight to about 50% by weight. In one embodiment, for instance, a thermoplastic elastomer or impact modifier may be present in the composition in an amount less than about 25% by weight, such as in an amount less than about 15% by weight, such as in an amount less than about 10% by weight. The thermoplastic elastomer or impact modifier is generally present in an amount greater than about 2% by weight, such as in an amount greater than about 5% by weight, such as in an amount greater than about 8% by weight, such as in an amount greater than about 10% by weight.

The compositions of the present disclosure can be compounded and formed into a polymer article using any technique known in the art. For instance, the respective composition can be intensively mixed to form a substantially homogeneous blend. The blend can be melt kneaded at an elevated temperature, such as a temperature that is higher than the melting point of the polymer utilized in the polymer composition but lower than the degradation temperature. Alternatively, the respective composition can be melted and mixed together in a conventional single or twin screw extruder. Preferably, the melt mixing is carried out at a temperature ranging from 100 to 280° C., such as from 120 to 260° C., such as from 140 to 240° C. or 180 to 220° C.

After extrusion, the compositions may be formed into pellets. The pellets can be molded into polymer articles by techniques known in the art such as injection molding, thermoforming, blow molding, rotational molding and the like.

In general, polymer compositions prepared according to the present disclosure can exhibit good formaldehyde emission and extractable performance. For instance, in some embodiments, the formaldehyde emission according to VDA-275 may be less than about 15 ppm, such as less than about 12 ppm, such as less than about 10 ppm, such as less than about 8 ppm, such as less than about 6 ppm, such as less than about 5 ppm. The emission may generally be greater than about 0.01 ppm, such as greater than about 0.5 ppm.

The formaldehyde extractable according to GB4806.6-2016 may, in some embodiments, be less than about 15 ppm, such as less than about 12 ppm, such as less than about 10 ppm, such as less than about 8 ppm, such as less than about 6 ppm, such as less than about 4 ppm, in any measurement medium, including when measured in water at 40° C. for 10 days, when measured in water at 100° C. for 30 minutes, when measured in 10% ethanol at 40° C. for 10 days, and when measured in oil at 40° C. for 10 days. The extractable, in any medium, may be lower than detectable limits, such as lower than about 0.3 ppm. In other embodiments, the extractable may be detectable (e.g., higher than about 0.3 ppm, such as higher than about 1 ppm).

The trioxymethylene and the 1,3-dioxolane extractable, when measured under the same conditions, may be less than about 5 ppm, such as less than about 4 ppm, such as less than about 3 ppm, such as less than about 2 ppm, such as less than about 1 ppm, such as less than about 0.5 ppm, such as less than about 0.25 ppm, such as less than about 0.1 ppm. The extractable, in any medium, may be lower than detectable limits, such as lower than about 0.05 ppm. In other embodiments, the extractable may be detectable (e.g., higher than about 0.05 ppm, such as higher than about 0.075 ppm).

While the polyoxymethylene polymer composition and polymer articles produced therefrom of the present disclosure provide improved emission properties, the compositions and articles may also exhibit excellent mechanical properties (ISO Test 527). For example, when tested according to ISO Test No. 527, the polymer composition may have a tensile modulus of greater than about 1,200 MPa, such as greater than about 2,000 MPa. The tensile modulus is generally less than about 10,000 MPa.

The polymer composition can exhibit a notched Charpy impact strength at 23° C. (ISO Test 179-1) of greater than about 3 kJ/m$^2$, such as greater than about 5 kJ/m$^2$. The notched Charpy impact strength is generally less than about 20 Id/m$^2$.

The polymer composition can exhibit a notched Charpy impact strength at −30° C. of greater than about 3 kJ/m$^2$, such as greater than about 5 kJ/m$^2$. The notched Charpy impact strength at −30° C. is generally less than about 20 kJ/m$^2$.

The polymer composition of the present disclosure can be used to produce various molded parts. The parts can be formed through any suitable molding process, such as an injection molding process or through a blow molding process. Polymer articles that may be made in accordance with the present disclosure include knobs, door handles, automotive decorative trim pieces, and the like without limitation. Other polymer articles, for instance, that may be made in accordance with the present disclosure include latches, levers, gears, pivot housings, speaker grills, and the like.

In one particular embodiment, the polymer composition is used to make a coffeemaker 10 as shown in FIG. 1. Coffeemakers are designed to heat liquids very rapidly and produce a heated beverage. Consequently, the operating environment, especially the internal operating environment, of a coffeemaker can change from room temperature to high temperature relatively quickly. Coffeemakers, such as coffeemaker 10 as shown in FIG. 1, also have many parts. In accordance with the present disclosure, various internal and external parts of the coffeemaker can be made from the polymer composition of the present disclosure, especially parts that are exposed to high temperature water.

A coffee making apparatus typically comprises a water heating unit, a coffee supply unit, and a brewing assembly. For the production of a heated beverage, coffee is fed from the coffee supply unit and heated water from the water heating unit to the brewing assembly. Typical brewing assemblies comprise a brewing head, an upper closure element, a lower closure element, and at least one linear guide element.

Figure 2:
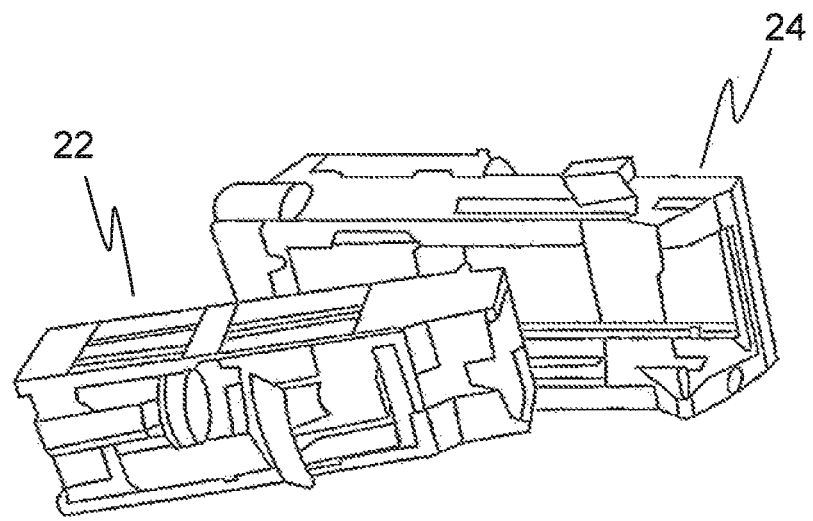
FIG. 2 illustrates one embodiment of a member of a coffee maker apparatus comprising a composition prepared according to the present disclosure.

Referring to FIG. 2, the coffeemaker 10 can include a first member 22 and a second member 24. The first member 22 and the second member 24, in one embodiment, can be part of the brewing assembly or part of the coffee supply unit. For example, the members 22 and 24 can be for receiving and loading coffee into a designated area, such as a capsule, for producing a coffee beverage. Because of close proximity to heated water, the members 22 and 24 may experience an operating environment well above 30° C., such as greater than 40° C., such as greater than 50° C., such as even greater than 60° C. Advantageously, members comprising compositions prepared according to the present disclosure may exhibit low formaldehyde emission and extraction when exposed to high temperature water.

Figure 3:
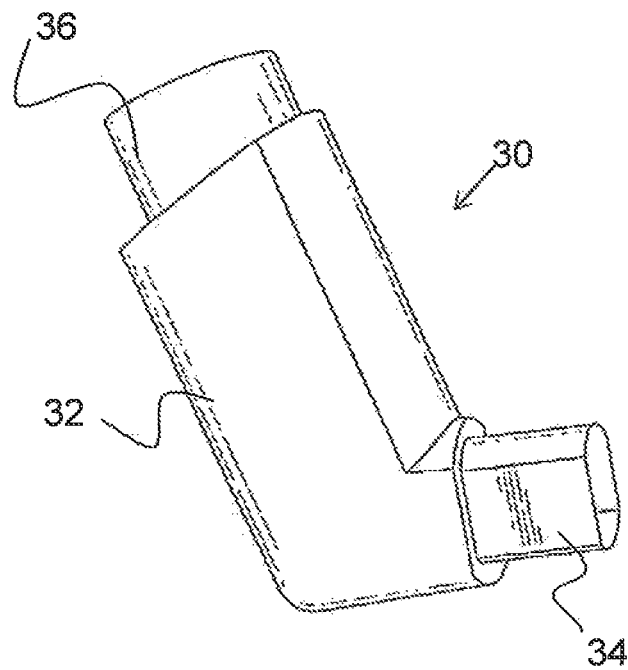
FIG. 3 illustrates one embodiment of a medical apparatus comprising a composition prepared according to the present disclosure.

As previously described, in one embodiment, the formaldehyde stabilizer package does not include a guanamine compound, a hydantoin, a substituted hydantoin, an amino acid, and/or an ethylene urea. Guanamine-free compositions are particularly well suited for use in producing medical products. For instance, referring to FIG. 3, an inhaler 30 is shown. The inhaler 30 includes a housing 32 attached to a mouthpiece 34. In operative association with the housing 32 is a plunger 36 for receiving a canister containing a composition to be inhaled. The composition may comprise a spray or a powder.

During use, the inhaler 30 administers metered doses of a medication, such as an asthma medication to a patient. The asthma medication may be suspended or dissolved in a propellant or may be contained in a powder. When a patient actuates the inhaler to breathe in the medication, a valve opens allowing the medication to exit the mouthpiece. In accordance with the present disclosure, the housing 32, the mouthpiece 34 and the plunger 36 can all be made from a polymer composition as described above.

Figure 4:
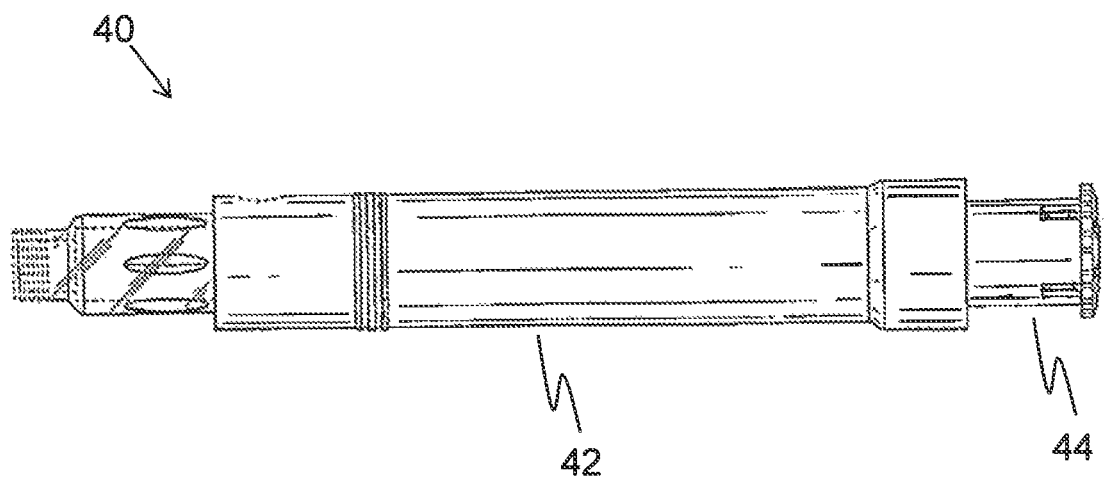
FIG. 4 illustrates another embodiment of a medical apparatus comprising a composition prepared according to the present disclosure.

Referring to FIG. 4, another medical product that may be made in accordance with the present disclosure is shown. In FIG. 4, a medical injector 40 is illustrated. The medical injector 40 includes a housing 42 in operative association with a plunger 44. The housing 42 may slide relative to the plunger 44. The medical injector 40 may be spring loaded. The medical injector is for injecting a drug into a patient typically into the thigh or the buttocks. The medical injector can be needleless or may contain a needle. When containing a needle, the needle tip is typically shielded within the housing prior to injection. Needleless injectors, on the other hand, can contain a cylinder of pressurized gas that propels a medication through the skin without the use of a needle. In accordance with the present disclosure, the housing 42 and/or the plunger 44 can be made from a polymer composition as described above.

In one embodiment, polymer articles made in accordance with the present disclosure can be used to make components of a conveyor system. Conveyor systems, for instance, typically include a conveyor chain that moves over a track. Such conveyor systems can be used to move all different types of products and goods. In one embodiment, for instance, such conveyors are used to transport food products.

Figure 5:
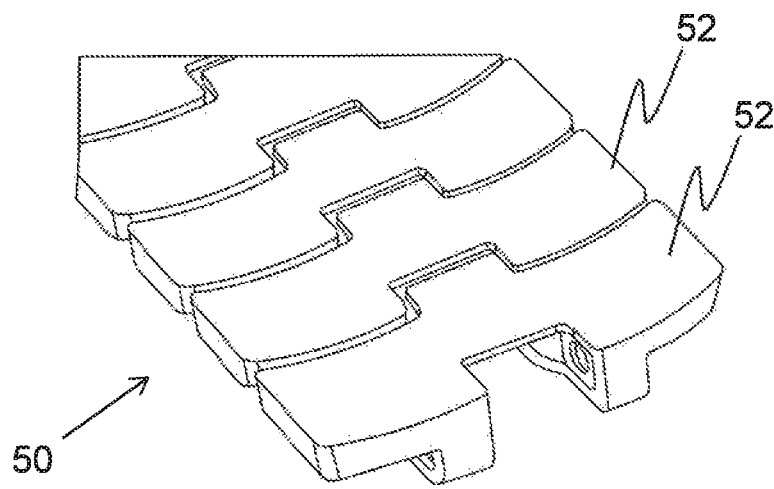
FIG. 5 illustrates one embodiment of a conveyance apparatus comprising a composition prepared according to the present disclosure.

Referring to FIG. 5, for instance, one embodiment of a portion of a conveyor chain 50 is illustrated. As shown, the conveyor chain 50 is made from a plurality of conveyor components 52 or links. Each of the conveyor components 52 includes a top surface for receiving and transporting food products. In accordance with the present disclosure, the conveyor component 52 can be made from the polymer composition of the present disclosure. Of particular advantage, the conveyor component 52 can include one or more coloring agents that provide the components with a desired surface appearance. Advantageously, components comprising compositions prepared according to the present disclosure may exhibit low formaldehyde emission and extraction when exposed to harsh cleaning conditions.

Figure 6:
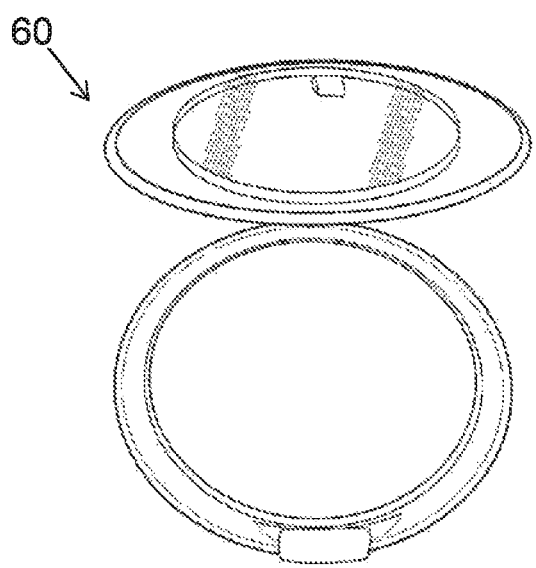
FIG. 6 illustrates one embodiment of a cosmetic closure apparatus comprising a composition prepared according to the present disclosure.

In yet another embodiment of the present disclosure, the polymer composition can be coated with a metal to produce cosmetic closures. For instance, FIG. 6 illustrates one embodiment of a cosmetic closure 60 that may be made in accordance with the present disclosure.

The preceding disclosure may be better understood in view of the following example.

Example

A polymer composition (Sample 1) was prepared according to the present disclosure and contained the following ingredients:

99.33 wt. % polyoxymethylene (MFI: 8.5 cm$^3$/10 min),
   0.30 wt. % triethylene glycol bis[3-(3-tert-butyl-4-hydroxy-5-methylphenyl)propionate],
0.20 wt. % ethylene bis(stearamide),
0.07 wt. % calcium 12-hydroxystearate, and
0.10 wt. % talc.

The following mechanical properties were obtained for Sample 1:

Tensile Modulus: 2640 MPa
   Yield Stress: 63.5 MPa
   Yield Strain: 10.5%
   Break Stress: 54 MPa
   Break Strain: 34%
Charpy Notched (Room Temperature): 5.8 kJ/m$^2$
Charpy Notched (−30° C.): 5.5 kJ/m$^2$ Sample 1 was injection molded into a 80 mm×50 mm×1 mm plaque for formaldehyde emission testing according to VDA-275. The following emission result was obtained:
   VDA-275: 9.5 ppm Plaques prepared as above were subjected to a formaldehyde extraction test, referred to herein as the "Formaldehyde Extraction Test". In particular, two plaques with a combined surface area of approximately 160 cm$^2$ were submerged in a 240 mL water bath at 80° C. (±10° C.) for 30 minutes. After 30 minutes had elapsed, the plaques were immediately removed from the bath and the water from the bath was cooled to room temperature in the same sealed (covered) container used for the bath. After homogenizing the water solution, spectrophotometric determination of formaldehyde content was carried out according to the Lutidin method (as compared to a reference solution which contained no specimen). A calculation factor of 1.5 was multiplied by the solution extinction measured by the spectrophotometer to give the extractable formaldehyde content. The following extractable content was measured:

Extractable Formaldehyde: 2.7 μg/cm²

Migration tests for trioxymethylene and 1,3-dioxolane were conducted by HS-GC-MS. All migration tests we carried out according to GB 4806.6-2016, first method. Calculations were performed with an area-volume ratio of 6 dm²/1 L (kg). The results of the tests are reported below:

| Test Item | First Reflow | Third Reflow | Limit |
|---|---|---|---|
| Trioxymethylene (ppm) | | | |
| distilled water, 40° C., 10 days | 0.27 | — | |
| distilled water, 100° C., 30 min. | 0.191 | 0.122 | 5 |
| 10% ethanol, 40° C., 10 days | 0.188 | — | |
| oil, 40° C., 10 days | 0.137 | — | |
| 1,3-dioxolane (ppm) | | | |
| distilled water, 40° C., 10 days | 0.27 | — | |
| distilled water, 100° C., 30 min. | N.D. | N.D. | 5 |
| 10% ethanol, 40° C., 10 days | N.D. | — | |
| oil, 40° C., 10 days | N.D. | — | |
| Formaldehyde (ppm) | | | |
| distilled water, 40° C., 10 days | 10.7 | — | |
| distilled water, 100° C., 30 min. | 5.57 | 3.81 | 15 |
| 10% ethanol, 40° C., 10 days | 10.7 | — | |
| oil, 40° C., 10 days | N.D. | — | |

N.D.—not detected (less than 0.05 ppm)

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the invention so further described in such appended claims.

What is claimed:

1. A polymer composition comprising:
 a polyoxymethylene polymer present in the polymer composition in an amount greater than about 60% by weight, the polyoxymethylene polymer having a melt volume flow rate of from about 1 cm³ per 10 min to about 80 cm³ per 10 min when tested at a temperature of 190° C. and at a load of 2.16 kg, the polyoxymethylene polymer comprising a polyoxymethylene copolymer having terminal hydroxyl groups, the polyoxymethylene polymer having a content of terminal hydroxyl groups of at least 5 mmol/kg, and wherein, in addition to terminal hydroxyl groups, the terminal groups of the polyoxymethylene polymer only including alkoxy groups, formate groups, acetate groups, aldehyde groups, or a combination thereof;
 a mineral nucleant;
 an antioxidant;
 an acid scavenger;
 one or more coloring agents; the one or more coloring agents comprising lead in an amount less than 50 ppm and zinc in an amount less than 100 ppm, wherein the one or more coloring agents are present in the polymer composition in conjunction with a dispersing agent, the dispersing agent comprising a polyethylene polymer, the polyethylene polymer having a molecular weight of from about 500 g/mol to about 10,000 g/mol, the polyethylene polymer being non-polar; and
 wherein the polymer composition is free of all formaldehyde scavengers and displays a formaldehyde emission of less than about 15 ppm when tested according to VDA Test 275 and displays a formaldehyde extractable content of less than 15 ppm when tested according to a formaldehyde extractable test in water at a temperature of 40° C. for 10 days, and wherein the polymer composition contains no polymeric nucleant.

2. A polymer composition as defined in claim 1, wherein the mineral nucleant comprises talc, talc being present in the polymer composition in an amount from about 0.01% by weight to about 1% by weight.

3. A polymer composition as defined in claim 1, wherein the acid scavenger comprises a carboxylic acid salt.

4. A polymer composition as defined in claim 3, wherein the carboxylic acid salt comprises an alkaline earth metal salt of a carboxylic acid.

5. A polymer composition as defined in claim 4, wherein the acid scavenger comprises a calcium hydroxy stearate, the acid scavenger being present in the polymer composition in an amount from about 0.01% by weight to about 1% by weight.

6. A polymer composition as defined in claim 1, wherein the polymer composition has an extractable formaldehyde content of less than about 8 ppm, when tested in water at 40° C. for 10 days.

7. A polymer composition as defined in claim 1, wherein the polymer composition further contains a lubricant.

8. A polymer composition as defined in claim 7, wherein the lubricant comprises an ethylene bis(stearamide), the ethylene bis(stearamide) being present in the polymer composition in an amount from about 0.01% by weight to about 1% by weight.

9. A polymer composition as defined in claim 1, wherein the dispersing agent comprises a polymer having a density of from about 0.92 g/cm³ to about 0.94 g/cm³.

10. A polymer composition as defined in claim 7, wherein the lubricant comprises polytetrafluoroethylene, ultrahigh molecular weight silicone, a silicone oil, or a wax.

11. A polymer composition as defined in claim 1, wherein the polymer composition further contains glass fibers.

12. A polymer composition as defined in claim 1, wherein the polymer composition further contains a thermoplastic elastomer.

13. A polymer composition as defined in claim 12, wherein the thermoplastic elastomer comprises a thermoplastic polyurethane elastomer.

14. A polymer composition as defined in claim 1, wherein the mineral nucleant comprises talc, talc being present in the polymer composition in an amount from about 0.1% by weight to about 1% by weight, the acid scavenger comprising a calcium hydroxy stearate, the calcium hydroxy stearate being present in the polymer composition in an amount from about 0.01% by weight to about 1% by weight, the polymer composition further containing ethylene bis(stearamide), and wherein the polymer composition is free of polymeric nucleants.

15. A polymer composition as defined in claim 14, wherein the polyoxymethylene polymer is present in the polymer composition in an amount greater than about 90% by weight.

16. A molded article made from the polymer composition as defined in claim 1.

17. A molded article as defined in claim 16, wherein the molded article comprises a consumer appliance part.

18. A molded article as defined in claim 16, wherein the molded article comprises a conveyor part.

19. A molded article as defined in claim 16, wherein the molded article comprises a part for a medical product.

20. A molded article formed from a polymer composition, the polymer composition comprising a polyoxymethylene polymer present in the polymer composition in an amount greater than about 60% by weight, the polyoxymethylene polymer having a melt volume flow rate of from about 1 cm³ per 10 min to about 80 cm³ per 10 min when tested at a temperature of 190° C. and at a load of 2.16 kg, the polyoxymethylene polymer comprising a polyoxymethylene copolymer having terminal hydroxyl groups, the polyoxymethylene polymer having a content of terminal hydroxyl groups of at least 5 mmol/kg, and wherein, in addition to terminal hydroxyl groups, the terminal groups of the polyoxymethylene polymer only including alkoxy groups, formate groups, acetate groups, aldehyde groups, or a combination thereof, talc being present in the polymer composition in an amount from about 0.01% by weight to about 1% by weight, an acid scavenger comprising a carboxylic acid salt, the acid scavenger being present in the polymer composition in an amount from about 0.01% by weight to about 1% by weight, a lubricant being present in the polymer composition in an amount from about 0.01% by weight to about 1% by weight, an antioxidant comprising a sterically hindered phenol, the antioxidant being present in the polymer composition in an amount from about 0.01% by weight to about 0.75% by weight, wherein the polymer composition comprises one or more coloring agents, the one or more coloring agents comprising lead in an amount less than 50 ppm and zinc in an amount less than 100 ppm, and wherein the polymer composition is free of all formaldehyde scavengers and displays a formaldehyde emission of less than about 15 ppm when tested according to VDA Test 275 and displays a formaldehyde extractable content of less than 15 ppm when tested according to a formaldehyde extractable test in water at a temperature of 40° ° C. for 10 days, and wherein the polymer composition contains no polymeric nucleant, the polymer composition exhibiting a tensile modulus of greater than about 2,000 MPa, a notched Charpy impact strength at 23° C. of greater than about 5 KJ/m², and exhibiting a notched Charpy impact strength at −30° C. of greater than about 5 KJ/m².

21. A molded article as defined in claim 20, wherein the molded article comprises part of a food processing or beverage processing device.

22. A polymer composition comprising:

a polyoxymethylene polymer present in the polymer composition in an amount greater than about 60% by weight, the polyoxymethylene polymer having a melt volume flow rate of from about 1 cm³ per 10 min to about 80 cm³ per 10 min when tested at a temperature of 190° C. and at a load of 2.16 kg, the polyoxymethylene polymer comprising a polyoxymethylene copolymer having terminal hydroxyl groups, the polyoxymethylene polymer having a content of terminal hydroxyl groups of at least 5 mmol/kg, and wherein, in addition to terminal hydroxyl groups, the terminal groups of the polyoxymethylene polymer only including alkoxy groups, formate groups, acetate groups, aldehyde groups, or a combination thereof;

a talc, the talc being present in the polymer composition in an amount of at least about 0.05 wt. % and less than about 2 wt. %;

an antioxidant;

an acid scavenger;

one or more coloring agents, wherein the one or more coloring agents are present in the polymer composition in conjunction with a dispersing agent, the dispersing agent comprising a polyethylene polymer, the polyethylene polymer having a molecular weight of from about 500 g/mol to about 10,000 g/mol, the polyethylene polymer being non-polar; and wherein the polymer composition is free of all formaldehyde scavengers and displays a formaldehyde emission of less than about 15 ppm when tested according to VDA Test 275 and displays a formaldehyde extractable content of less than 15 ppm when tested according to a formaldehyde extractable test in water at a temperature of 40° C. for 10 days, and wherein the polymer composition contains no polymeric nucleant.

23. The polymer composition of claim 22, wherein the talc is present in the polymer composition in an amount of at least about 0.1 wt. % and less than about 2 wt. %.

24. A polymer composition as defined in claim 1, wherein the polyoxymethylene polymer has a content of terminal hydroxyl groups of at least 15 mmol/kg.

* * * * *